United States Patent
Burns et al.

[15] 3,639,295
[45] Feb. 1, 1972

[54] FLAME-RETARDANT, POLYURETHANE COATING COMPOSITIONS

[72] Inventors: Joseph P. Burns; Joseph Feltzin, both of Wilmington, Del.; Frank T. Sanderson, Huntington Valley, Pa.

[73] Assignee: Atlas Chemical Industries, Inc., Wilmington, Del.

[22] Filed: Dec. 9, 1968

[21] Appl. No.: 782,484

[52] U.S. Cl. ..........................252/182, 106/15 FP, 117/136, 260/2.5 AJ, 260/2.5 AR, 260/77.5 AR, 260/928, 260/DIG. 24
[51] Int. Cl. ..........................................................C09d 5/18
[58] Field of Search..............252/182; 260/2.5 AR, 2.5 AM, 260/2.5 AJ, 928, 929, 613 D, 607, 591, 619, 77.5 AR, DIG. 24; 106/15 FP; 117/136

[56] References Cited

UNITED STATES PATENTS

| | | | |
|---|---|---|---|
| 3,309,427 | 3/1967 | Zech et al. | 260/929 |
| 3,322,698 | 5/1967 | Wiles et al. | 260/77.5 |
| 3,407,150 | 10/1968 | Wismer et al. | 252/182 |

*Primary Examiner*—Richard D. Lovering
*Assistant Examiner*—Irwin Gluck
*Attorney*—Kenneth E. Mulford, Roger R. Horton and Ernest G. Almy

[57] ABSTRACT

Polyurethane coating compositions are provided which, after application to substrates, yield transparent coatings having superior flame retardancy and resiliency. The coating compositions comprise a solvent and a polyurethane reaction product of halogen containing polyol, phosphorus containing polyol, and organic polyisocyanate.

9 Claims, No Drawings

FLAME-RETARDANT, POLYURETHANE COATING COMPOSITIONS

This invention relates to coating compositions. More particularly, this invention relates to clear, flame-retardant, polyurethane coating compositions.

Polyurethane coating compositions are well known in the prior art. It is known that numerous insoluble, inorganic compounds can be milled into conventional organic varnishes to produce paints which, after application to substrates, will prevent the spread of fire through the ultimate construction. However, there are many areas where clear coatings are preferred over paints. It is also known that the incorporation of halogens and phosphorus into polymeric organic compounds will improve the fire retardancy of the organo polymers, and this concept has been followed in the development of fire-retardant varnishes. Heretofore, however, the incorporation of the required concentrations of halogen and phosphorous has had a deleterious effect on polymer resilience. Clear, polyurethane coating compositions are needed in the coating arts and trades which exhibit the desired fire resistance without sacrifice of the necessary coating properties and without the requirement for addition of insoluble, inorganic materials which tend to make the final coatings dull and opaque; and, accordingly, the search for such coating compositions has been unremitting and wide spread.

It is an object of this invention to provide improved polyurethane coating compositions. It is another object of this invention to provide moisture-curing, liquid, polyurethane coating compositions which, after application to substrates, yield transparent coatings having superior flame retardancy and resiliency. It is another object of this invention to provide a blend of polyols. Other objects of this invention will become apparent from the following description.

The polyurethane coating compositions of this invention comprise an organic solvent solution of a polyurethane reaction product of 1. a halogen containing polyol characterized by the generalized formula

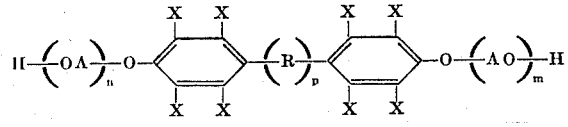

wherein each X represents hydrogen or halogen and at least one X is halogen, R represents an alkylene group containing from one to four carbon atoms,

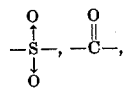

$-CH_2OCH_2-$, or $-O-$, each A represents an alkylene group containing from two to four carbon atoms, $p$ is 0 of 1, $n$ and $m$ are integers, and the sum of $n$ and $m$ is from 2 to 10, 2. a polyhydroxy phosphate ester product obtained by sequentially reacting polyphosphoric acid and alkylene oxide with a polyhydric alcohol, provided that alkylene oxide is used in the final reaction, and 3. an organic polyisocyanate.

Throughout this specification and in the appended claims the term "a polyphosphoric acid" is meant to include phosphoric acid anhydride $P_2O_5$ and hydrates thereof containing two or more phosphorus atoms per mol. It is preferred to employ the anhydride itself or a polyphosphoric acid containing at least 80 percent of the anhydride. Particularly preferred is a polyphosphoric acid containing from 82 to 84 percent $P_2O_5$.

The halogen containing polyols (1) defined by the formula given above are known compounds, and they may be prepared in any suitable manner conventional in the prior art. For example, the halogen containing polyols may be prepared by reacting one mol of a halogenated polyol having the formula

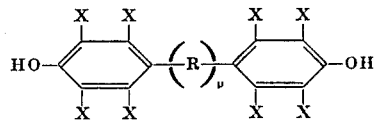

wherein X, R, and $p$ have the signification given above, with from 2 to 10 mols of alkylene oxide. Illustrative examples of alkylene oxides which may be used are ethylene oxide, propylene oxide, and butylene oxide. The preferred alkylene oxide is propylene oxide. The following are typical examples of the halogen containing polyols (1) defined by the formula above: polyoxypropylene(2.4) 2,2-bis(4-hydroxy-dibromophenyl) propane; polyoxypropylene(2.4) 2,2-bis(2,3,5,6-tetrabromo-4-hydroxy- phenyl) propane; polyoxypropylene(2) 2,2-bis(2,3,5,6-tetrabromo-4-hydroxyphenyl) propane; polyoxypropylene(2) 2,2-bis(2,3,5,6-tetraiodo-4-hydroxylphenyl) propane; polyoxyethylene(8) 2,2-bis(2,3-dichloro-4-hydroxyphenyl) propane; polyoxybutylene(2.1) 2,2-bis(2,3-dichloro-5,6-dibromo-4-hydroxylphenyl) propane; polyoxyethylene(2) 2,2-bis(2-chloro-4-hydroxyphenyl) propane; polyoxypropylene(10) bis(4-hydroxy-dibromophenyl) sulfone; polyoxypropylene(4) bis (4-hydroxy-dibromobenzyl) ether; polyoxypropylene(2.1) bis (4-hydroxy-dibromophenyl) ketone; polyoxypropylene(2) bis(4-hydroxy-dibromophenyl) ether; polyoxypropylene(5) 1,1'-dihydroxy-tetrabromobiphenyl; polyoxypropylene(2.1) bis(4-hydroxy-dibromophenyl) methylene; polyoxyethylene(2.2) 2,2-bis(4-hydroxy-dibromophenyl) propane.

A preferred class of halogen containing polyols useful in this invention are those polyols characterized by the generalized formula:

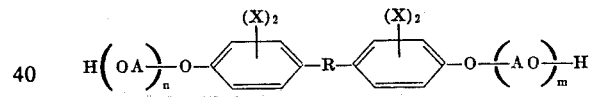

wherein X is bromine or chlorine, and preferably bromine; A is ethylene or propylene, and preferably propylene; R represents an alkylene group containing from one to four carbon atoms, and preferably $-C(CH_3)_2-$; $n$ and $m$ are integers; and the sum of $n$ and $m$ is from 2 to 6, and preferably from 2 to 4.

The polyhydroxy phosphate ester product (2) defined above are known in the prior art as shown by U.S. Pat. No. 3,309,427, the disclosure of which is hereby incorporated hereinto by reference. The polyhydroxy phosphate ester products may be prepared by reacting a polyhydric alcohol with polyphosphoric acid in conventional manner to provide an acidic partial ester and then neutralizing the residual acidity by reaction with an alkylene oxide. Preferably, the proportion of polyhydric alcohol to polyphosphoric acid taken is at least sufficient together with any water of composition in the phosphoric acid component, to convert all phosphorus present to the orthophosphate form. It is further preferred that the proportion of polyhydric alcohol reacted with the polyphosphoric acid be sufficiently small to insure that the average functionality of the resulting acidic partial ester composition is greater than 3.1. When the reacting polyhydric alcohol is dihydric this preferred condition is met by keeping the ratio (on a molar basis) of the sum of the alkylene glycol and water of hydration in the polyphosphoric acid to $P_2O_5$ at a value no greater than 2.75. When the reacting polyhydric alcohol is trihydric or of higher functionality the proportion may be higher without objectionably decreasing the functionality but the introduction of more than enough of such polyol than required to bring the ratio of the sum of polyol and water of hydration to $P_2O_5$ to a value greater than 3 is not preferred.

The polyhydric alcohol and polyphosphoric acid are brought together under reaction conditions sufficiently mild that esterification between P-OH and alcoholic hydroxyl groups with concomitant liberation of water is avoided. For example, $P_2O_5$ in dry powder form, or as a slurry in an inert diluent such as toluene, may be added gradually to the polyhydric alcohol while maintaining the temperature in the range of from 50° to 150° C., and preferably below about 100° C. The reaction is complete when all the $P_2O_5$ is dissolved. When employing a hydrated polyphosphoric acid, the reaction with polyhydric alcohol goes so readily that external heat need not be applied. In fact, in the interest of obtaining light colored products it is highly preferred to control the temperature, by external cooling, or by limiting the rate of introduction of one reactant into the other, to below about 60° C. It is advantageous, to obtain more rapid mixing and better heat transfer, to carry out the reaction in the presence of an inert diluent, preferably a solvent for the polyhydric alcohol and/or the resulting acidic partial ester.

The resulting acidic partial ester is then reacted with at least a sufficient quantity of an alkylene oxide to substantially neutralize the acidity. The preferred amount of alkylene oxide used in the oxyalkylation is from 8 to 12 mols of alkylene oxide per mol of acidic partial phosphoric ester. Illustrative examples of alkylene oxides which may be used include propylene oxide, ethylene oxide, and butylene oxide. The alkylene oxide is added gradually to the agitated reaction mass from the first stage while controlling the temperature, particularly in the early stages, to below 100° C. and preferably below 50° C. Unreacted alkylene oxide and diluent, if such has been employed, are stripped, from the neutralized product under reduced pressure and moderately elevated temperatures to yield a substantially neutral polyhydroxy phosphate ester.

The polyhydroxy phosphate ester may be reacted with additional polyphosphoric acid, under the reaction conditions described above for reacting the polyhydric alcohol with polyphosphoric acid, to form an acidic partial ester. The acidic partial ester is then reacted with at least a sufficient quantity of an alkylene oxide to substantially neutralize the acidity. The resulting polyhydroxy phosphate ester may be sequentially reacted with additional polyphosphoric acid and alkylene oxide, provided that alkylene oxide is used in the final reaction.

Polyhydric alcohols preferred for use in the first stage of preparation indicated above, are liquid polyhydric alcohols selected from the group consisting of (a) base polyols having from two to nine hydroxyl groups per mol and hydroxyl numbers ranging from 1,250 to 1,860 and (b) their adducts with up to twice their own weight of two to four carbon alkylene oxides. An illustrative list of polyhydric alcohols so-defined includes ethylene, diethylene and triethylene glycols; propylene and dipropylene glycols, butylene glycol; glycerol; methyl glycerol, ethylene oxide adducts of glycerol containing up to four oxyethylene groups per mol; propylene oxide adducts of glycerol containing up to four oxypropylene groups per mol; propylene oxide adducts of sorbitol or of mannitol containing up to six oxypropylene groups per mol; propylene oxide adducts of sucrose containing up to ten oxypropylene groups per mol; epichlorhydrin adducts of sorbitol containing up to four hydroxy-chloropropyl groups per mol; and the like.

The following are illustrative examples of the preparation of polyhydroxy phosphate ester products (2).

EXAMPLE A 1,300 pounds of propylene glycol and 2,915 pounds of dioxane are charged to an autoclave and heated to about 24° C. 2,915 pounds of polyphosphoric acid, preheated to about 82° C., are slowly added to the autoclave. The temperature in the autoclave is allowed to rise to 60°–63° C. After adding the polyphosphoric acid to the autoclave, the reaction is continued for 30 minutes at 60°–63° C. 6,000 pounds of propylene oxide are then added at a rate which allows the temperature to be controlled at 60°–63° C. and the pressure at 20–30 p.s.i.g. The temperature is then raised to 93°–99° C. 2,170 pounds of propylene oxide are then added while controlling the temperature at 96°–102° C. The reaction is then continued until the acid number is less than 0.8. The reaction product is then cooled and vacuum stripped to remove dioxane and unreacted propylene oxide.

EXAMPLE B 770 grams (4.5 mols) of polyphosphoric acid (83 percent $P_2O_5$) are charged to a 5-L, three-necked flask equipped with stirrer, thermometer, $CO_2$ inlet, dropping funnel and water-cooled condenser. A $CO_2$ blanket is started at a rate of 100 cc./min. 400 cc. dioxane are added and the stirrer started. 171 grams (2.25 mols) propylene glycol are slowly added with no heat being applied to the reaction mass. When the reaction exotherm starts, a cold water bath is applied to minimize temperature rise. After all the propylene glycol is charged, the mass is held at 30°–35° C. for 30 minutes. Propylene oxide is then slowly added, the rate of addition being such that the temperature does not exceed 45°–50° C. In a period of 11 hours, 2,500 grams (44.6 mols) are so added. The reaction product is essentially neutral. The dioxane and excess propylene oxide are then stripped off using final conditions of 0.1 mm. vacuum at 75° C. The resulting product is a clear, moderately viscous liquid having an acid number of 0.6 and an hydroxyl number of 326 and containing 8.9 percent phosphorus. A yield of 3,095 grams is obtained.

EXAMPLE C 228 grams (3 mols) of propylene glycol dissolved in 250 ml. dioxane are charged into an agitated reaction flask through which a current of carbon dioxide is led to maintain an inert atmosphere. The flask is submerged in a water bath at 23° C., and 513 grams (3 mols) of a commercial polyphosphoric acid (83 percent $P_2O_5$) are added gradually over a period of a half hour. The maximum temperature in the reaction mixture is 49° C. When the temperature has decreased to 28° C. (20 minutes stirring while cooling in the 23° C. bath), the flow of carbon dioxide is stopped; and the addition of propylene oxide is started at a rate such that the reaction temperature does not exceed 50° C. In the course of 6 hours, 1,800 grams (32.3 mols) of propylene oxide are added. After standing overnight the product is stripped at a maximum temperature of 80° C. at less than 1 mm. pressure to remove dioxane and unreacted propylene oxide. The yield is 2,404 grams of a water-white, syrupy polyhydric phosphate ester having an acid number of 1.1 and a hydroxyl number of 367 and containing 7.7 percent phosphorus.

EXAMPLE D 513 grams (3.0 mols) of polyphosphoric acid (83 percent $P_2O_5$) is reacted with 228 grams (3.0 mols) of propylene glycol in the presence of 400 ml. dioxane as described in example B. The resulting acid partial ester is then reacted with 1,500 grams (16.2 mols) epichlorohydrin slowly added over a period of 5 hours while maintaining a temperature of 35°–40° C. The neutralization is completed by adding 800 grams (14.3 mols) propylene oxide over a period of 3 hours, while maintaining a temperature of 35°–40° C. The dioxane and excess propylene oxide are then stripped off using final conditions of <0.2 mm. vacuum at 80° C. The resulting product (2,832 grams) is a moderately viscous, clear liquid having an acid number of 3.7 and a hydroxyl number of 318 and containing 20.6 percent chlorine and 6.9 percent phosphorus.

EXAMPLE E

The procedure of example D is repeated with the variation that only 114 grams (1.5 mols) of propylene glycol are employed in the first stage and that the amount of propylene oxide consumed in neutralizing the acidic ester is 507 grams (8.8 mols). The net yield obtained is 2,634 grams of a moderately viscous, clear liquid ester having an acid number of 4 and a hydroxyl number of 297 and containing 7.2 percent phosphorus and 22.0 percent chlorine.

EXAMPLE F 171 grams of polyphosphoric acid (83 percent $P_2O_5$) were reacted with 290 grams (0.7 mol) of a polyoxypropylene ether of sorbitol containing approximately four oxypropylene groups per mol in the presence of 200 cc. dioxane. 605 grams (10.4 mols) propylene oxide were slowly added over a period of 10 hours to yield an essentially neutral ester.

The dioxane and excess propylene oxide were then stripped off using final conditions of <0.1 mm. vac. at 80° C. The yield was 909 grams of a light colored moderately viscous liquid which analyzed AN=1.5, OH=372 and percent P=7.9.

EXAMPLE G 552 grams (6.0 mols) of anhydrous glycerol were charged to a 3-L three-necked flask equipped with stirrer, thermometer, $CO_2$ inlet, dropping funnel and water-cooled condenser. A $CO_2$ blanket was started at a rate of 100 cc./minute. Heat was applied and the temperature raised to 105°–110° C. 425 grams (3 mols) phosphorus pentoxide slurried in 850 grams toluol were then slowly added over a period of 1 hour. The mass was held at 100°–105° C. for 30 minutes and then cooled to 80° C. The acidic partial ester was neutralized by the slow addition of 1,614 grams (28.8 mols) of propylene oxide. The toluol and excess propylene oxide were then stripped off using final conditions of <0.2 mm. vacuum at 108° C. The resulting product was a clear, moderately viscous liquid which analyzed AN=1.6, OH=402 and percent P=7.8. A yield of 2,397 was obtained.

EXAMPLE H 532 grams (2.0 mols) of a glycerol-propylene oxide adduct containing 3 oxypropylene groups per mol were reacted in the presence of 200 cc. dioxane with 142 grams (1.0 mol) phosphorous pentoxide the latter being added in 25 grams increments over a period of 1 hour, the temperature being maintained at 90°–95° C. during the reaction period. The temperature was then lowered to 25° C. A total of 464 grams (8.3 mols) propylene oxide were then reacted over a period of 10 hours at which point an essentially neutral ester was obtained. The dioxane and excess propylene oxide were then stripped off using final conditions of <1.0 mm. vacuum at 75° C. The resulting product was a clear moderately viscous liquid which analyzed AN=1.0, OH=321 and percent P=6. A yield of 1,026 grams was obtained.

A wide variety of organic polyisocyanates (3) may be used to prepare the polyurethane reaction products, including aromatic, aliphatic, and cycloaliphatic polyisocyanates. Illustrative examples of polyisocyanates include tolylene diisocyanate, 4,4'-methylene-biscyclohexylisocyanate (NACCONATE-H12), diphenyl diisocyanate, triphenyl diisocyanate, 1,3-phenylene diisocyanate, methylene bis(4-phenyl isocyanate), 4-chloro-1, 3-phenylene diisocyanate, 1,5-naphthalene diisocyanate, 1,6-hexamethylene diisocyanate, 1,10-decamethylene diisocyanate, isophorone diisocyanate, 1,5-tetrahydronaphthalene diisocyanate, ethylene diisocyanate, polymethylene polyphenyl polyisocyanate (PAPI), and 4,4'''-triphenyl methane triisocyanate. Arylene diisocyanate, that is those diisocyanates in which each of the two isocyanates is attached directly to an aromatic ring, are preferred.

The relative amounts of halogen containing polyol (1), polyhydroxy phosphate ester product (2), and organic polyisocyanate (3) which are used to prepare the polyurethane reaction products of this invention may vary over a wide range. In general, satisfactory results may be obtained when the reactants are used in an amount such that the ratio of isocyanate groups to hydroxyl groups is from 0.5 to 3. While maintaining this ratio, the polyisocyanate may represent from 30 to 75 weight percent of the reactants and the mixture of halogen containing polyol and polyhydroxy phosphate ester product may represent from 70 to 25 weight percent of the reactants. The halogen containing polyol may comprise from 50 to 90 weight percent, and preferably from 65 to 75 weight percent, based on the total weight of polyol; and the polyhydroxy phosphate ester product may comprise from 50 to 10 weight percent, and preferably 25 to 35 weight percent, based on the total weight of polyol.

The particular ratio of isocyanate groups to hydroxyl groups used depends upon the type of coating composition desired. If an isocyanate-terminated polyurethane is desired, the ratio used is greater than 1 and preferably from about 1.5 to 2.5. The isocyanate-terminated polyurethane may be cured by the moisture in the atmosphere or by the addition of a polyhydric alcohol to the coating composition prior to application to a substrate. If the ratio used is less than 1, a hydroxyl-terminated polyurethane is formed. These coating compositions require the addition of an isocyanate or an isocyanate-terminated prepolymer prior to the application of the coating composition. The reactants may also be used in an amount such that the ratio of isocyanate groups to hydroxyl groups is about 1. In such cases, the reactants are mixed together and applied to a substrate before gellation occurs.

The polyurethane reaction products specified above may be prepared by reacting organic polyisocyanate with both a halogen containing polyol (1) of the above-defined type and a polyhydroxy phosphate ester product (2) of the above-defined type. The reaction may be carried out according to the so-called one-shot method or the prepolymer method. However, regardless of the particular method selected for the preparation of the polyurethanes, it is essential that both the halogen containing polyol (1) and the polyhydroxy phosphate ester product (2) are used.

The one-shot method comprises reacting the organic polyisocyanate with a mixture of halogen containing polyol and polyhydroxy phosphate ester. By this method, all the polyisocyanate, halogen containing polyol, and polyhydroxy ester are reacted in a single step.

Broadly, the prepolymer method comprises sequentially reacting the organic polyisocyanate, halogen containing polyol, and polyhydroxy phosphate ester. Thus, the polyurethane reaction product may be prepared sequentially by first preparing an isocyanate terminated prepolymer by reacting at least one compound selected from the group consisting of halogen containing polyol (1) and polyhydroxy phosphate ester (2) with a stoichiometric excess of at least one organic polyisocyanate, and then in a second step reacting the prepolymer with at least one compound selected from the group consisting of halogen containing polyol (1) and polyhydroxy phosphate ester (2), provided, of course, that at least one of the compounds employed is a halogen containing polyol (1) and that at least one of the compounds is a polyhydroxy phosphate ester (2). The polyurethane reaction product may also be prepared by first preparing a hydroxyl terminated prepolymer by reacting an organic polyisocyanate with a stoichiometric excess of a mixture of halogen containing polyol (1) and polyhydroxy phosphate ester (2), and then in a second step reacting the prepolymer with an additional organic polyisocyanate. The polyurethanes may also be prepared by first reacting an organic polyisocyanate with halogen containing polyol (1) or polyhydroxy phosphate ester (2) to form either a hydroxyl terminated prepolymer or an isocyanate terminated prepolymer, depending upon the amount of organic polyisocyanate employed, and then in a second step reacting the prepolymer with additional organic polyisocyanate, halogen containing polyol (1), polyoxyalkylene ether diol and/or polyhydroxy phosphate ester (2).

The above-described methods of preparing the polyurethane reaction product may be carried out at any convenient temperature, preferably above 25° C. to hasten the reaction but not above 150° C. where undesirable side reactions occur, in a substantially anhydrous environment for the length of time required to react substantially all of the available hydroxyl groups of the halogen containing polyol (1) and the polyhydroxy phosphate ester (2) with the isocyanate groups of the organic polyisocyanate. At the especially convenient temperatures of 70° to 90° C., the reaction usually requires from 1 to 8 hours. The reaction may be carried out in the presence of an inert organic solvent.

The solvents employed in the coating compositions must be nonreactive to the isocyanates and hence must not have active hydrogen in their structure. The solvents should be sufficiently low boiling that they will vaporize from the compositions when coated onto a substrate in a thin film. Hydrocarbon solvents and oxygen-containing solvents such as ketones, ethers, and esters are suitable. Illustrative examples of specific solvents which may be employed in the coating compositions of this invention include: toluene, xylene, hexyl acetate, ethylene glycol monoethylether acetate, butyl acetate, ethylene glycol monobutylether acetate, methyl ethyl ketone, acetone, dipropylether, dimethyl formamide, tetrahydrofuran, ethyl acetate, methyl acetate, and others. Aliphatic hydrocarbons may be used as diluents to extend the coating composition to the desired concentration of solids.

The proportion of solvent may be varied over a rather wide range; however, about 20 percent by weight of solvent is a reasonable minimum considering that below this amount of solvent the solution becomes so viscous that stirring is quite difficult. Correspondingly, the formation of good, homogeneous films is also difficult at low concentrations of solvents. A practical upper limit of solvents is about 70 percent by weight. Above 70 percent, an unnecessary quantity of solvent is used and the films formed are quite thin. It is to be understood, however, that lower and higher concentrations of solvent may be used if desired.

The amount of polyurethane reaction product present in the coating compositions may vary over a wide range. In general, the amount of polyurethane may vary from 30 to 80 percent by weight based on the total weight of coating compositions. The coatings formed are quite thin at lower concentrations. At higher concentrations, the solutions are quite viscous and difficult to apply to the substrate and the formation of homogeneous films is difficult. However, lower and higher concentrations of the polyurethane reaction product may be used if desired.

The flame retardancy of the above described coating compositions may be increased, without sacrifice of other desirable properties such as resiliency and clarity, by incorporating into the coating composition a compound characterized by the formula

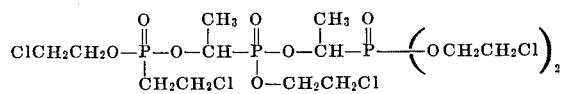

The amount of said compound employed in the coating composition may vary from 5 to 25 percent by weight, and preferably from 5 to 15 percent by weight, based on the total weight of the coating composition. The said compound may be obtained from the Monsanto Chemical Company under the name Phosgard C–22–R. The coating composition may also contain amounts of other additives which are conventionally used, such as haloalkyl phosphates and alkylene diamine tetraacetic acid.

The coating compositions of this invention may be applied to various substrates by any of the conventional fluid coating techniques, for example: spray, dip, brush, knife, and roller coating. The films or coatings formed from the coating compositions of this invention are characterized by excellent flame-retardancy, excellent resiliency, high tensile strength, high abrasion resistance, and good adhesion to many surfaces, such as: wood, metal, glass, cellulosic and synthetic fabrics, leather, ceramics, etc. The compositions are particularly useful as wood varnishes on floors, furniture, bowling alleys and bowling pins.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight, unless otherwise stated.

EXAMPLE 1

A mixture of 148.5 grams of polyoxypropylene (2.4) 2,2-bis(4-hydroxy-dibromophenyl) propane and 65.6 grams of the polyhydroxy phosphate ester product of example A are dissolved in a solvent mixture of 80 grams toluene and 72 grams of ethylene glycol monoethyl ether acetate. The solution is placed in a one-liter, round-bottom flask equipped with mechanical stirrer, temperature indicator, inert gas inlet and condenser. The flask is placed in a heating mantle, heat is applied, and carbon dioxide is bubbled into the solution. The stirring rate is set at 130 revolutions per minute, and the solution is heated to 135° C. Approximately 8 ml. of solvent are removed, then the polyol solution is cooled below distillation temperature. 139 grams of HYLENE TM, a commercial mixture of toluene diisocyanate isomers, are charged to a flask identical to the one described above. The diisocyanate is dissolved in a solvent mixture consisting of 47 grams of toluene and 47 grams of ethylene glycol monoethyl ether acetate. 322 grams of the polyol solution described above are added to the diisocyanate solution over a 45 minute period at a temperature of 28°–32° C. and stirring rate of 130 revolutions per minute. Carbon dioxide gas is bubbled into the reaction mixture, which is heated to 80° C. The reactants are maintained at 80° C. for 5 hours, and then cooled to room temperature. The reaction product contains 5.5 percent free NCO and exhibits a viscosity of 165 centipoises at 25° C. To 100 parts of this product are added 0.1 part of a silicone flow-control agent (General Electric SF–1023) and 10 parts of Phosgard C–22–R. A 20-mil film of the product is drawn on plate glass and conditioned for 2 weeks at 25° C. and 50–60 percent relative humidity. The dry film is heated one hour at 50° C. and 90–100 percent relative humidity and then removed from the glass plate. The film has a tensile strength of 6,000 p.s.i. and an elongation of 8 percent as determined on an Instron Tester at 25° C. and 50 percent relative humidity, using a 2-inch span at a test speed of 2 inches per minute. Separately, the product is painted onto poplar panels according to the method of ASTM Test D–1360–58. After a two week conditioning period at 25° C. and 50 percent relative humidity, the fire resistance of the panels are determined by the ASTM cabinet test method (ASTM Test D–1360–58). The burned panels have an average weight loss of 9 grams and an average char volume of 4 cubic inches.

EXAMPLE 2

20.40 parts of polyoxypropylene (2.4) 2,2-bis(4-hydroxy-dibromophenyl) propane, 9.00 parts of the polyhydroxy phosphate ester product of Example A, 8.42 parts of PHOSGARD C–22–R, 20.24 parts of xylene, and 20.24 parts of cellosolve acetate are charged to the reaction flask described in example 1, and the mixture is stirred at room temperature until a clear, homogeneous solution is obtained. The polyol solution is then heated to 80° C. and 21.10 parts of toluene diisocyanate are added over a 45 minute period. The reactants are maintained at 80° C. for 5 hours under a blanket of nitrogen. The reaction mixture is then cooled to room temperature and 0.60 parts of a surface active agent (Dow Cornings Silicon DC–11) is added. The resulting varnish has a solids content of 59 percent.

EXAMPLE 3

Following the procedure of example 2, a solution is prepared by dissolving 18.4 parts of polyoxypropylene (2.4) 2,2-bis(4-hydroxy-dibromophenyl) propane, 7.9 parts of the polyhydroxy phosphate ester product of example A, and 9.1 parts of Phosgard C-22-R in 18.2 parts of xylene and 18.2 parts of cellosolve acetate. 28.2 parts of 4,4'-methylenebiscyclohexylisocyanate are added to the solution over a 30-minute period, and the reaction mixture is heated under nitrogen and stirring at 100° C. for 6 hours. The reaction product is cooled to room temperature; and 6.4 parts of xylene, 6.4 parts of cellosolve acetate, and 0.6 part of silicon surfactant are added. The resulting varnish has a solid content of 57 percent. The varnish has very good gloss retention and nonyellowing properties. A poplar panel, coated with the varnish and tested according to ASTM-D-1360-58, showed a weight loss of 8.45 grams.

EXAMPLE 4

24.2 parts of polyoxypropylene(2.4) 2,2-bis(4hydroxy-dibromophenyl) propane, 10.6 parts of the polyhydroxy phosphate ester product of example A, 20 parts of xylene, and 20 parts of cellosolve acetate are charged to the reaction flask described in example 1, and the mixture is stirred at room temperature until a clear, homogeneous solution is obtained. The solution is then heated to 80° C. and 25.2 parts of toluene diisocyanate are added over a 45-minute period. The reactants are maintained at 80° C. for 5 hours under a blanket of nitrogen. The reaction mixture is then cooled to room temperature and the mixture diluted with equal weight parts of xylene and cellosolve acetate to a solid content of 55 percent. To 100 grams of this product are added 0.6 gram of silicon surfactant. A poplar panel, coated with this varnish and tested according to ASTM-D-1360-58, showed a weight loss of 15.1 grams and a char volume of 10.2 cubic inches.

EXAMPLE 5

A flame resistant polyurethane coating composition is prepared and tested following the procedure of example 4 in every respect except that 10 grams of PHOSGARD C-22-R are added along with the silicon surfactant. Coated poplar panels showed a weight loss of 15.4 grams and a char volume of 5.8 cubic inches.

EXAMPLE 6

18.9 parts of polyoxypropylene (2.4) 2,2-bis(4hydroxy-dibromophenyl) propane, 8.1 parts of the polyhydroxy phosphate ester product of example A, and 9.1 parts of PHOSGARD C-22-R are dissolved in 18.2 parts of xylene and 18.2 parts of cellosolve acetate according to the procedure of example 2. 27.5 parts of diphenyl methane diisocyanate are added to the polyol solution over a 30 minute period. The reaction mixture is stirred for 5 hours at 80° C. under a nitrogen blanket and then cooled to room temperature. The resulting varnish has a 64 percent solids content. A poplar panel, coated with the varnish and tested according to ASTM-D-1360-58, showed a weight loss of 7.6 grams.

EXAMPLE 7

348 grams of polyoxyethylene(10) bis(4-hydroxy-dichlorophenyl) sulfone, 131.2 grams of the polyhydroxy phosphate ester product of example B, 127 grams of toluene, and 119 grams of ethylene glycol monoethyl ether acetate are charged to a 2-liter flask, and the mixture is stirred at room temperature until a clear, homogeneous solution is obtained. The polyol solution is then heated to 80° C. and 278 grams of tolylene diisocyanate are added over a one hour period. The reactants are maintained at 80° C. for 5 hours. The reaction mixture is then cooled to room temperature. Poplar panels coated with the resulting varnish pass ASTM Test D-1360-58.

EXAMPLE 8

426 grams of polyoxybutylene(2) bis(4-hydroxy-tetrabromophenyl) ether, 131 grams of the polyhydroxy phosphate ester product of example C, and 280 grams of tolylene diisocyanate are reacted following the procedure of example 7. The resulting product is a clear, moisture-curing, polyurethane varnish which, after application to poplar panels, yields transparent coatings having superior flame retardancy and resiliency.

EXAMPLE 9

145.5 grams of polyoxypropylene(4) dichloro-dibromo-4,4'-dihydroxybiphenyl, 65.5 grams of the polyhydroxy phosphate product of example D, and 140 grams of tolylene diisocyanate are reacted according to the procedure of example 1 to form a clear, moisture-curing, polyurethane varnish.

EXAMPLE 10

73 grams of polyoxypropylene(4) dichloro-dibromo-4,4'-dihydroxybiphenyl, 73 grams of polyoxypropylene(2.4) 2,2-bis(4-hydroxy-dibromophenyl) propane, 65.5 grams of the polyhydroxy phosphate product of example E, and 145 grams of tolylene diisocyanate are reacted according to the procedure of example 7 to form a polyurethane varnish.

EXAMPLE 11

426 grams of polyoxybutylene(2) bis (4-hydroxy-tetrabromophenyl) ether, 131 grams of the polyhydroxy phosphate ester product of example F, and 280 grams of tolylene diisocyanate are reacted following the procedure of example 7. The resulting product is a clear, moisture-curing, polyurethane varnish which, after application to poplar panels, yields transparent coatings having superior flame retardancy and resiliency.

EXAMPLE 12

145.5 grams of polyoxypropylene(4) dichloro-dibromo-4,4'-dihydroxybiphenyl, 65.5 grams of the polyhydroxy phosphate product of example G, and 140 grams of tolylene diisocyanate are reacted according to the procedure of example 1 to form a clear, moisture-curing, polyurethane varnish.

EXAMPLE 13

73 grams of polyoxypropylene(4) dichloro-dibromo-4,4'-dihydroxybiphenyl, 73 grams of polyoxypropylene(2.4) 2,2-bis(4-hydroxy-dibromophenyl) propane, 65.5 grams of the polyhydroxy phosphate product of example H, and 145 grams of tolylene diisocyanate are reacted according to the procedure of example 7 to form a polyurethane varnish.

EXAMPLE 14

320 grams of a polyisocyanate having the formula

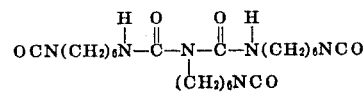

(available from Naftone Inc. under the name Desmodur N-75) are added to a blend of 200 grams of ethylene glycol monoethyl ether acetate, 80 grams of PHOSGARD C-22-R, 85 grams of the polyhydroxy phosphate ester product of example A, 195 grams of polyoxypropylene(2.4) 2,2,-bis(4-hydroxy-dibromophenyl) propane, and 120 grams of xylene. The resulting mixture is a clear varnish which, after application to a substrate yields transparent coatings having superior flame retardancy and resiliency.

EXAMPLE 15

364 grams of a polyisocyanate characterized by the formula

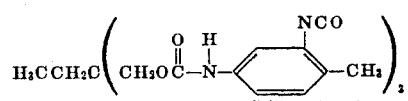

(available from the Mobay Chemical Company under the name Mondur CB–75) are added to a mixture of 75 grams of PHOSGARD C–22–R, 77 grams of the polyhydroxy phosphate product of example A, 176 grams of polyoxypropylene(2.4) 2,2-bis(4-hydroxy-dibromo-phenyl) propane, 208 grams of xylene, and 100 grams of ethylene glycol monoethyl ether acetate. The resulting mixture is a clear varnish which may be applied to a substrate to form a flame-retardant, polyurethane coating.

EXAMPLE 16

235 grams of polyoxypropylene(2.4) 2,2-bis(4-hydroxy-dibromophenyl) propane, 103 grams of the polyhydroxy phosphate product of example A, and 98 grams of PHOSGARD C–22–R are dissolved in 280 grams of xylene and 134 grams of ethylene glycol monoethyl ether acetate according to the procedure of example 2. 250 grams of tolylene diisocyanate are added to the polyol solution over a 45-minute period. The reaction mixture is stirred for 5 hours at 80° C. under nitrogen blanket and then cooled to room temperature. The resulting product is a solution of an isocyanate terminated polyurethane. To 600 grams of this solution are added 400 grams of a mixture of 49 grams of PHOSGARD C–22–R, 52 grams of the polyhydroxy phosphate product of example A, 119 grams of polyoxypropylene(2.4) 2,2-bis(4-hydroxy-dibromophenyl) propane, 127 grams of xylene, and 53 grams of ethylene glycol monoethyl ether acetate. The resulting product is a clear varnish which, after application of poplar panels, yields a transparent coating having superior flame retardancy and resiliency.

EXAMPLE 17

A solution of an isocyanate-terminated polyurethane is prepared as described in example 16. To 769 grams of this solution are added 231 grams of a mixture containing 114 grams of dipropyleneglycol, 60 grams of xylene, and 57 grams of ethylene glycol monoethyl ether acetate. The resulting mixture is a clear varnish which may be applied to a substrate to form a flame-retardant polyurethane coating.

Although this invention has been described with reference to specific chemical compounds, including specific halogen containing polyols, phosphorus containing polyols, polyisocyanates, and solvents, as well as specific method steps, it will be appreciated that numerous other chemical compounds may frequently be substituted for those described and that specific method steps may frequently be modified or even eliminated, all within the spirit and scope of this invention as defined in the appended claims.

Having described the invention, what is desired to be secured by Letters Patent is:

1. A composition which is suitable for the preparation of polyurethanes and which comprises from 50 to 90 weight percent of a halogen containing polyol and from 50 to 10 weight percent of a polyhydroxy phosphate ester product, wherein said weight percent is based on the total weight of halogen containing polyol and polyhydroxy phosphate ester product, wherein said halogen containing polyol is characterized by the generalized formula

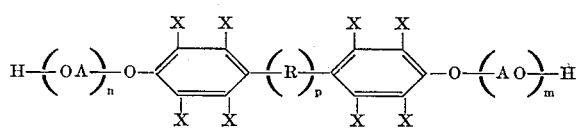

wherein each X represents hydrogen or halogen and at least one X is halogen, R represents an alkylene group containing from one to four carbon atoms,

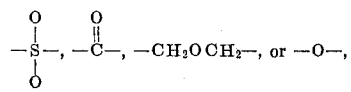

each A represents an alkylene group containing from two to four carbon atoms, $p$ is 0 or 1, $n$ and $m$ are integers, and the sum of $n$ and $m$ is from two to ten and wherein said polyhydroxy phosphate ester product is obtained by a process which comprises a first stage of forming an acidic partial ester by reaction of a polyphosphoric acid containing at least 80 percent by weight of phosphoric anhydride with a polyhydric alcohol selected from the group consisting of base polyols having from two to nine hydroxyl groups per mol and hydroxyl numbers from 1,250 to 1,860 and their adducts with up to twice their own weight of two to four carbon alkylene oxides, and a second stage of reacting the said acidic partial ester with sufficient amount of an alkylene oxide having from two to four carbon atoms to substantially neutralize the acidity, wherein, in the first stage, the ratio of the sum of the mols of said polyhydric alcohol and the mols of water of composition in the polyphosphoric acid to mols of $P_2O_5$ in the reaction mixture is no greater than 2.75 when the said polyhydric alcohol is a diol and is no greater than 3 when the said polyhydric alcohol is a functionality greater than 3 but, in any case, is at least sufficient to convert all the phosphorous present to the ortho phosphate form.

2. A composition of claim 1 wherein the said polyphosphoric acid is phosphoric anhydride.

3. A composition of claim 1 wherein the said polyhydric alcohol is selected from the group consisting of ethylene glycol, diethylene glycol, triethylene glycol, propylene glycol, dipropylene glycol, butylene glycol, glycerol, methyl glycerol, ethylene oxide adducts of glycerol containing up to four oxyethylene groups per mol, propylene oxide adducts of glycerol containing up to four oxypropylene groups per mol, propylene oxide adducts of sorbitol containing up to six oxypropylene groups per mol, propylene oxide adducts of mannitol containing up to six oxypropylene groups per mol, propylene oxide adducts of sucrose containing up to 10 oxypropylene groups per mol, and epichlorohydrin adducts of sorbitol containing up to four hydroxy-chloropropyl groups per mol.

4. A composition of claim 1 wherein the polyhydroxy phosphate ester product is obtained by a process which comprises a first stage of forming an acidic partial ester by reaction of a polyphosphoric acid containing at least 80 percent by weight of phosphoric anhydride with a dihydric alcohol and a second stage of reacting the said acidic partial ester with sufficient amount of an alkylene oxide having from two to four carbon atoms to substantially neutralize the acidity, wherein, in the first stage, the ratio of the sum of the mols of said dihydric alcohol and the mols of water of composition in the polyphosphoric acid to mols of $P_2O_5$ in the reaction mixture is no greater than 2.75.

5. A composition of claim 4 wherein the dihydric alcohol is propylene glycol and the alkylene oxide is propylene oxide.

6. A composition of claim 1 wherein the halogen containing polyol is characterized by the generalized formula:

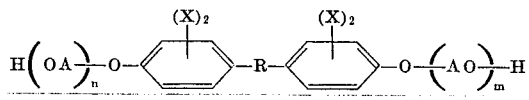

wherein X is bromine or chlorine, A is an ethylene or propylene group, R is an alkylene group containing from one to four carbon atoms, $n$ and $m$ are integers, and the sum of $n$ and $m$ is from 2 to 6.

7. A composition of claim 6 wherein X is bromine, A is propylene, R is

and the sum of $n$ and $m$ is from 2 to 4.

8. A composition of claim 1 wherein the halogen containing polyol is selected from the group consisting of polyoxypropylene(2.4) 2,2-bis(4-hydroxy-dibromophenyl) propane; polyoxypropylene(2.4) 2,2-bis(2,3,4,6-tetra-bromo-4-hydroxyphenyl) propane; polyoxypropylene(2) 2,2-bis(2,3,5,6-tetrabromo-4-hydroxyphenyl) propane; polyoxypropylene(2) 2,2-bis(2,3,5,6-tetraiodo-4-hydroxy-phenyl) propane; polyoxyethylene(8) 2,2-bis(2,3-dichloro-4-hydroxyphenyl) propane; polyoxybutylene(2.1) 2,2-bis(2,3-dichloro-5,6-dibromo-4-hydroxylphenyl) propane; polyoxyethylene(2) 2,2-bis(2-chloro-4-hydroxy-phenyl) propane; polyoxypropylene(10) bis(4-hydroxy-dibromophenyl) sulfone; polyoxypropylene(4) bis (4-hydroxy-dibromobenzyl) ether, polyoxypropylene(2.1) bis (4-hydroxy-dibromophenyl) ketone; polyoxypropylene(2) bis(4-hydroxy-dibromophenyl) ether; polyoxypropylene(5) 1,1'-dihydroxy-tetrabromobiphenyl; polyoxypropylene(2.1) bis(4-hydroxy-dibromophenyl) methylene; and polyoxyethylene(2.2) 2,2-bis(4-hydroxy-dibromophenyl) propane.

9. A composition of claim 1 which contains from 65 to 75 weight percent of halogen containing polyol and from 25 to 35 percent of the polyhydroxy phosphate ester product.

\* \* \* \* \*

UNITED STATES PATENT OFFICE
CERTIFICATE OF CORRECTION

Patent No. 3,639,295      Dated February 1, 1972

Inventor(s) Joseph P. Burns, Joseph Feltzin and Frank T. Sanderson

It is certified that error appears in the above-identified patent and that said Letters Patent are hereby corrected as shown below:

Column 4, line 64, "   0.2 mm." should read  -- 0.1 mm. --.
Column 5, line 29, "   0.2 mm." should read  -- 0.1 mm. --;
line 63, "4,4'''-triphenyl" should read  -- 4,4',4"-triphenyl --.

Signed and sealed this 5th day of September 1972.

(SEAL)
Attest:

EDWARD M. FLETCHER, JR.      ROBERT GOTTSCHALK
Attesting Officer      Commissioner of Patents